United States Patent
Aharoni et al.

(10) Patent No.: US 11,113,471 B2
(45) Date of Patent: Sep. 7, 2021

(54) AUTOMATIC DETECTION OF CLAIMS WITH RESPECT TO A TOPIC

(71) Applicant: International Business Machines Corporation, Armonk, NY (US)

(72) Inventors: Ehud Aharoni, Kfar Saba (IL); Yonatan Bilu, Jerusalem (IL); Dan Gutfreund, Raanana (IL); Daniel Hershcovich, Givat Ela (IL); Tamar Lavee, Tel Aviv (IL); Ran Levy, Givatayim (IL); Ruty Rinott, Jerusalem (IL); Noam Slonim, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 907 days.

(21) Appl. No.: 15/872,021

(22) Filed: Jan. 16, 2018

(65) Prior Publication Data

US 2019/0220515 A1    Jul. 18, 2019

Related U.S. Application Data

(63) Continuation of application No. 14/697,658, filed on Apr. 28, 2015, now Pat. No. 10,013,470.

(Continued)

(51) Int. Cl.
   *G06F 40/00*     (2020.01)
   *G06F 40/30*     (2020.01)
   *G06N 5/02*      (2006.01)
   *G06N 5/00*      (2006.01)
   *G06F 40/279*    (2020.01)
   (Continued)

(52) U.S. Cl.
   CPC .......... *G06F 40/30* (2020.01); *G06F 16/2465* (2019.01); *G06F 40/279* (2020.01); *G06F 40/295* (2020.01); *G06N 5/006* (2013.01); *G06N 5/022* (2013.01); *G06F 16/24578* (2019.01)

(58) Field of Classification Search
   CPC .......... G06F 16/2465; G06F 16/24578; G06F 40/30; G06F 40/279; G06F 40/295; G06N 5/022; G06N 5/006; G06N 7/005; G06N 20/10
   See application file for complete search history.

(56) References Cited

U.S. PATENT DOCUMENTS

| | | | |
|---|---|---|---|
| 8,280,885 B2 * | 10/2012 | Cardie | G06F 16/93 707/737 |
| 2010/0023311 A1 * | 1/2010 | Subrahmanian | G06F 40/30 704/2 |

(Continued)

FOREIGN PATENT DOCUMENTS

| | | | | |
|---|---|---|---|---|
| CN | 104462408 B | * | 9/2017 | |
| WO | WO-2018197639 A1 | * | 11/2018 | ........... G06F 16/745 |

OTHER PUBLICATIONS

Dligach, Dmitriy. High-performance word sense disambiguation with less manual effort. University of Colorado at Boulder, 2010. (Year: 2010).*

*Primary Examiner* — Diedra McQuitery
(74) *Attorney, Agent, or Firm* — Dvir Gassner

(57) ABSTRACT

A method comprising using at least one hardware processor for: receiving a topic under consideration (TUC) and content relevant to the TUC; detecting one or more claims relevant to the TUC in the content, based on detection of boundaries of the claims in the content; and outputting a list of said detected one or more claims.

20 Claims, 2 Drawing Sheets

Related U.S. Application Data

(60) Provisional application No. 62/014,133, filed on Jun. 19, 2014.

(51) Int. Cl.
*G06F 40/295* (2020.01)
*G06F 16/2458* (2019.01)
*G06F 16/2457* (2019.01)

(56) References Cited

U.S. PATENT DOCUMENTS

2011/0099133 A1* 4/2011 Chang .................. G06F 16/353
706/12
2012/0303357 A1 11/2012 Yasin
2014/0012863 A1 1/2014 Sundaresan et al.

* cited by examiner

AUTOMATIC DETECTION OF CLAIMS WITH RESPECT TO A TOPIC

CROSS-REFERENCE TO RELATED APPLICATIONS

This application claims the benefit of U.S. Provisional Patent Application No. 62/014,133, entitled "Automatic Detection of Claims with Respect to a Topic", filed Jun. 19, 2014, the contents of which are incorporated herein by reference in their entirety.

This application claims the benefit of U.S. application Ser. No. 14/697,658, entitled "Automatic Detection of Claims with Respect to a Topic", filed Apr. 28, 2015, the contents of which is hereby incorporated by reference in their entirety.

BACKGROUND

The present invention relates to the field of text analysis and synthesis.

A basic task that people engage in on a daily basis is to provide claims with respect to some topic and support these claims. For example, people may require claims to persuade others in the course of a debate over a certain topic. Persuading can either take the form of influencing someone to take your point of view, agreeing to your opinion, performing a certain task and so forth. Examples can come from various domains such as law, politics, marketing, financial and business advising, etc. In such scenarios, people are required to provide convincing claims (and counter claims) in order to persuade the other side.

Text mining, also referred to as text analytics (or analysis), is often defined as the automated process of deriving high-quality information from text (specifically, large amounts of text) via computer processing. High-quality information is typically derived through the devising of patterns and trends through means such as statistical pattern learning and machine learning. Text mining usually involves the process of structuring the input text (usually parsing, along with the addition of some derived linguistic features and the removal of others, and subsequent insertion into a database), deriving patterns within the structured data, and finally evaluation and interpretation of the output. 'High quality' in text mining usually refers to some combination of relevance, novelty, and interestingness. Typical text mining tasks may include text categorization, text clustering, concept/entity extraction, production of granular taxonomies, sentiment analysis, document summarization, and entity relation modeling (i.e., learning relations between named entities).

Text analysis may involve information retrieval, lexical analysis to study word frequency distributions, pattern recognition, tagging/annotation, information extraction, data mining techniques including link and association analysis, visualization, and predictive analytics. The overarching goal may be, essentially, to turn text into data for analysis, via application of methods such as natural language processing (NLP) and analytical methods.

With continuous advancements and an increase in user popularity, data mining and text analysis technologies may serve as an invaluable resource across a wide range of disciplines.

The technology is now broadly applied for a wide variety of needs, including government, research and business needs. Applications of text analysis may include intelligence, security, e-discovery, records management, publishing, automated ad placement, social media monitoring, scientific discovery etc. The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method comprising using at least one hardware processor for: receiving a topic under consideration (TUC) and content relevant to the TUC; detecting one or more claims relevant to the TUC in the content, based on detection of boundaries of the claims in the content; and outputting a list of said detected one or more claims.

There is provided, in accordance with another embodiment, a computer program product comprising a non-transitory computer-readable storage medium having program code embodied therewith, the program code executable by at least one hardware processor to: receive a topic under consideration (TUC) and content relevant to the TUC; detect one or more claims relevant to the TUC in the content, based on detection of boundaries of the claims in the content; and output a list of said detected one or more claims.

There is provided in accordance with a further embodiment, a system comprising: (i) a storage device having stored thereon instructions for: receiving a topic under consideration (TUC) and content relevant to the TUC, detecting one or more claims relevant to the TUC in the content, based on detection of boundaries of the claims in the content, and outputting a list of said detected one or more claims; and (ii) at least one hardware processor configured to execute said instructions.

In some embodiments, the method further comprises using said at least one hardware processor for receiving a background related to the TUC.

In some embodiments, the method further comprises using said at least one hardware processor for detecting sentences in the content which are highly probable to comprise claims relevant to the TUC, wherein said detection of one or more claims relevant to the TUC is performed in the detected sentences based on detection of boundaries of the claims in said detected sentences.

In some embodiments, said detecting of sentences comprises detecting features of a type selected from the group consisting of: features that characterize a claim in its general sense, features that assess the relevancy of a sentence to the TUC and features that are a mix of features that characterize a claim in its general sense and features that assess the relevancy of a sentence to the TUC.

In some embodiments, said detection of boundaries comprises: applying a boundaries course filter; and applying a boundaries fine grained filter.

In some embodiments, the method further comprises using said at least one hardware processor for detecting sections in the content which are highly probable to comprise claims relevant to the TUC, wherein said detection of one or more claims relevant to the TUC is performed in the detected sections based on detection of boundaries of the claims in the detected sections.

In some embodiments, the method further comprises using said at least one hardware processor for detecting sentences in said detected sections which are highly probable to comprise claims relevant to the TUC, wherein said detection of one or more claims relevant to the TUC is performed in said detected sentences, based on detection of boundaries of the claims in said detected sentences.

In some embodiments, the method further comprises using said at least one hardware processor for phrasing the detected one or more claims.

In some embodiments, the method further comprises using said at least one hardware processor for classifying the detected one or more claims with respect to the TUC, wherein said classifying comprises characterizing said one or more claims according to predefined types of claims.

In some embodiments, the method further comprises using said at least one hardware processor for calculating a claim score for each of said one or more detected claims and ranking each of said one or more detected claims based on its claim score.

In some embodiments, the method further comprises using said at least one hardware processor for applying said detecting of one or more claims recursively on previously detected claims.

In some embodiments, said program code is further executable by said at least one hardware processor to detect sentences in the content which are highly probable to comprise claims relevant to the TUC, wherein said detection of one or more claims relevant to the TUC is performed in the detected sentences based on detection of boundaries of the claims in said detected sentences.

In some embodiments, said program code is further executable by said at least one hardware processor to detect sections in the content which are highly probable to comprise claims relevant to the TUC, wherein said detection of one or more claims relevant to the TUC is performed in the detected sections based on detection of boundaries of the claims in the detected sections.

In some embodiments, said program code is further executable by said at least one hardware processor to detect sentences in said detected sections which are highly probable to comprise claims relevant to the TUC, wherein said detection of one or more claims relevant to the TUC is performed in said detected sentences, based on detection of boundaries of the claims in said detected sentences.

In some embodiments, said program code is further executable by said at least one hardware processor to calculate a claim score for each of said one or more detected claims and rank each of said one or more detected claims based on its claim score.

In some embodiments, said program code is further executable by said at least one hardware processor to apply said detecting of one or more claims recursively on previously detected claims.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
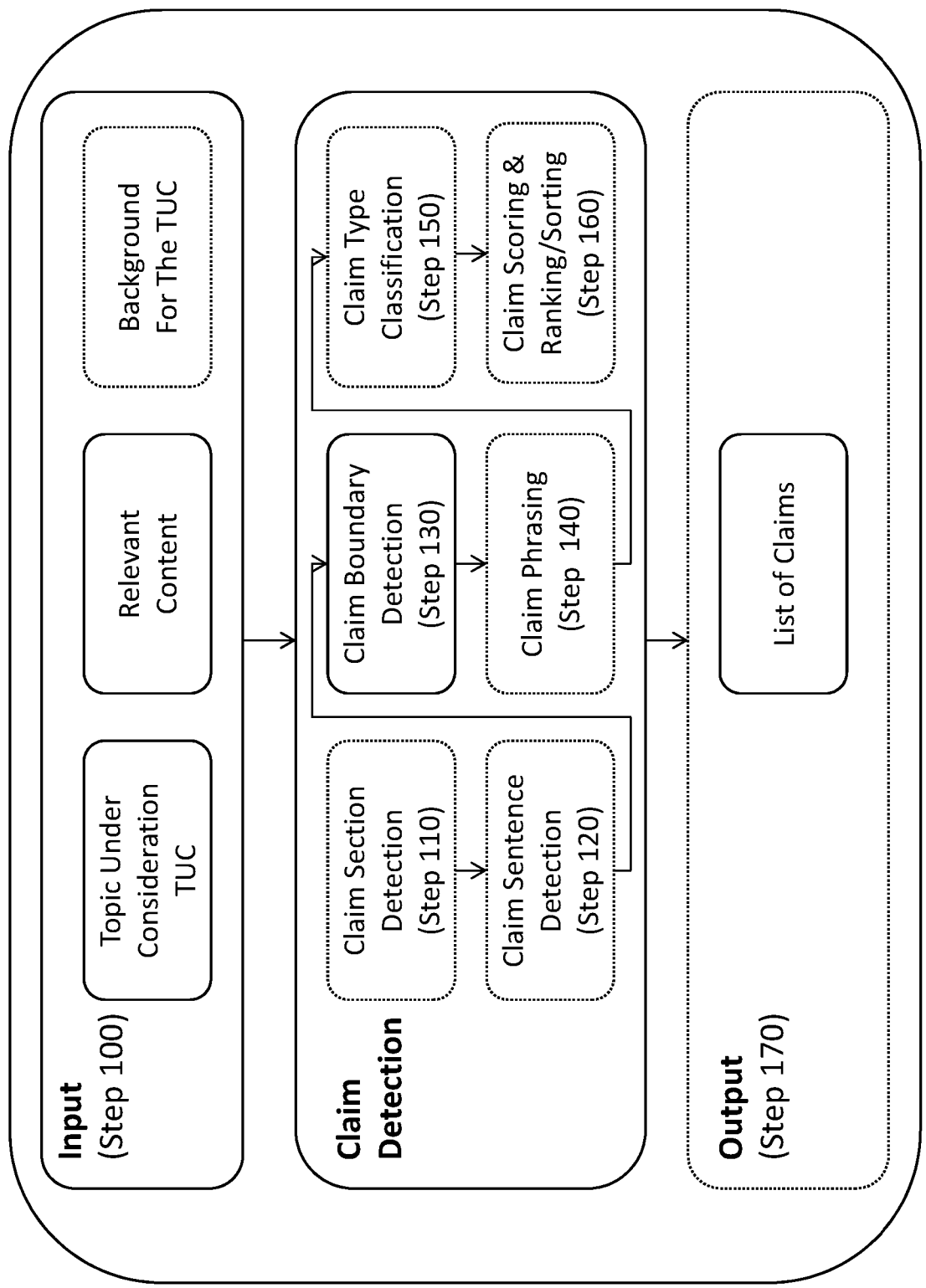
FIG. 1 shows a block diagram describing the flow of a method, constructed and operative in accordance with an embodiment of the disclosed technique.

Automatic detection of claims relevant to a given Topic Under Consideration (TUC) (i.e., Context-Dependent Claim Detection (CDCD)) from a given relevant content is disclosed herein. The claims may be supporting or contesting the TUC. Claim boundaries may be detected in the content. Additionally or alternatively, claims boundaries may be detected in sections and/or sentences of the content, which were identified as probable to include Context Dependent Claims (CDC), thus forming graded claim detection. The claims may be assigned with scores with respect to various characteristics, such as level of certainty and quality characteristics (e.g., conciseness and/or generality) and ranked accordingly. Furthermore, the claim detection may be applied recursively on detected claims in order to detect indirect claims and counter claims derived from the detected claims (i.e., the detected claim may be used as the TUC).

By using the disclosed automatic detection of claims, one may detect claims supporting his/her point of view as well as be prepared for counter claims which the other side may raise while discussing the TUC. Thus, the disclosed technique is likely to detect a plethora of high quality and diverse claims.

The term "token", as referred to herein, may relate to a word and/or a punctuation mark, according to its specific context.

The term "Topic Under Consideration" (TUC), as referred to herein, may relate to a single free-text sentence or phrase which frames a discussion.

The term "claim", as referred to herein with respect to a TUC, may relate to a general, typically concise statement with respect to the TUC, such as a statement which directly supports or contests the TUC. Some examples for topics and claims which support (Pro claim) or contest (Con claim) the topics are described herein below.

Example 1

Topic: Performance enhancing drugs in professional sports should be permitted.
Pro Claim: As outright prevention of doping is an impossibility, all doping should be legalized.
Con Claim: With doping legal, all competitive athletes would be compelled to use drugs.

Example 2

Topic: Violent video games should be banned.
Con Claim: Video game publishers unethically train children in the use of weapons.
Pro Claim: Violent games help students deal with stress and aggression.

Example 3

Topic: Boxing should be banned.
Pro Claim: It is the only sport when the intention is to inflict serious injury on your opponent.
Con Claim: Boxing commissions and other sanctioning bodies were established to regulate the sport.

The distinction between a CDC and other related texts may be quite subtle, as illustrated in Table 1 below.

TABLE 1

Examples for CDCs and for statements that should not be considered as CDCs. The V and X indicate if the candidate is a CDC for the given TUC, or not, respectively.
TUC: The sale of violent video games to minors should be banned

| | | |
|---|---|---|
| S1 | Violent video games can increase children's aggression | V |
| S2 | Video game addiction is excessive or compulsive use of computer and video games that interferes with daily life | X |
| S3 | Many TV programmers argue that their shows just mirror the violence that goes on in the real world goes on in the real world | X |
| S4 | Violent video games should not be sold to children | X |
| S5 | Video game publishers unethically train children in the use of weapons | V |

For example, automatically distinguishing a CDC like S1 from a statement that simply defines a relevant concept like S2, from a claim which is not relevant enough to the given TUC like S3, or from a statement like S4 that merely repeats the given TUC in different words, may be challenging. Further, CDCs may be of different flavors, ranging from factual assertions like S1 to statements that are more of a matter of opinion (Bo Pang and Lillian Lee. 2008. Opinion mining and sentiment analysis. *Foundations and Trends in Information Retrieval*, 2(1-2):1-135) like S5, adding to the complexity of the task. Received data (see under "Experimental Results") may suggest that even if one focuses on Wikipedia articles that are highly relevant to the given TUC, only ≈2% of their sentences may include CDCs.

Moreover, as illustrated in Table 2, detecting the exact CDC boundaries may be far from trivial, as in a typical single Wikipedia sentence there may be many optional boundaries to consider.

TABLE 2

A CDC is often only a small part of a single Wikipedia sentence - e.g., the part marked in bold in this example. Detecting the exact CDC boundaries represents an additional challenge.
TUC: The sale of violent video games to minors should be banned

| | |
|---|---|
| S1 | Because violence in video games in interactive and not passive, critics such as Dave Grossman and Jack Thompson argue that violence in games hardens children to unethical acts, calling first-person shooter games "murder simulators", although no conclusive evidence has supported this belief. |

Thus, one may be faced with a large number of candidate CDCs, of which only a tiny fraction may represent positive examples that might be quite reminiscent of some of the negative examples.

CDCD may be characterized by several distinctive features. One of them is the definition of a Context Dependent Claim (CDC) with respect to a given context (as implied from its name), i.e., the input TUC. Thus, identifying general characteristics of a claim-like statement may not be sufficient, since one should further identify the relevance of the candidate claim to the TUC.

In addition, the disclosed CDCD is not restricted to a particular domain or to structured data, but may rather consider free-text Wikipedia articles in a diverse range of subject matters. Moreover, pinpointing the exact claim boundaries may be required, which may not necessarily match a whole sentence or even a clause in the original text.

Furthermore, the disclosed CDCD approach may be designed as a cascade, or funnel, of components (e.g., sections detection, sentences detection, claims detection etc.), which may receive as input a TUC along with relevant content and may output the CDCs contained therein. The purpose of the funnel may be to gradually focus on smaller and smaller CDC-containing text segments, while filtering out irrelevant text. Thus, the cascade may divide the high level CDCD problem into smaller and more tangible problems. For example: given an article, detect sentences that include CDCs; given a sentence, detect the exact CDC boundaries; given a set of CDC candidates, rank them so that true candidates are on top.

By breaking the CDCD problem into independent sub-problems, at each stage the skew between positive examples and negative examples may be less daunting, thus easier to handle, for example, by classical machine learning techniques. In addition, since much surplus text may be filtered along the cascade, "downstream" components may typically examine much smaller amounts of text, and thus may plausibly make use of more demanding algorithms. In addition, this conceptual separation may naturally allow developing features tailored individually to each task.

In general, each component of the disclosed CDCD may be developed independently, e.g., within the classical supervised learning paradigm. For example, numeric features may be extracted from binary-labeled text segments, and may be used to train a classifier. Next, this classifier may be used to assign a score to each incoming test candidate and high-scoring candidates may be passed on to the next component. In addition, rule-based filters may be used to discard some of the candidates.

The disclosed automatic detection of claims (i.e., automatic CDCD) may be used as a stand-alone tool, for example, for supporting human debate on a given TUC (i.e., in conjunction with a tool that detects relevant content) or as part of a tool which may use the detected claims, for example, for constructing debate arguments or for constructing an entire speech such as disclosed in U.S. patent application Ser. No. 14/265,408, filed Apr. 30, 2014, which is incorporated herein by reference in its entirety.

Reference is now made to FIG. 1, which shows a block diagram describing the flow of a method, constructed and operative in accordance with an embodiment of the disclosed technique.

In a step 100, a TUC and content relevant to the TUC, such as a set of free-text articles relevant to the TUC, may be received. The TUC may be a debatable topic which may be represented as a single free-text sentence. The content may be detected in advance at different textual content resources, such as Wikipedia unstructured text documents, the archive of the New York Times and/or the abstracts in PubMed. The content may include sentences, paragraphs, articles or full documents. The content may be provided manually and/or by automatic retrieval methods (see, for example: Craig Macdonald, Rodrygo L. T. Santos, Iadh Ounis, and Ian Soboroff. 2010. Blog track research at trec. SIGIR Forum, 44(1):58-75, August; Wei Zhang, Clement Yu, and Weiyi Meng. 2007. Opinion retrieval from blogs. In *Proceedings of the Sixteenth ACM Conference on Conference on Information and Knowledge Management*, CIKM '07, pages 831-840, New York, N.Y., USA. ACM.). Optionally, the method may further include a step of retrieving relevant content, manually and/or by such automatic retrieval methods.

Optionally, additional content may be received that may provide background related to the TUC. The background may elaborate on the TUC. For example, the background may provide key words with respect to the TUC, such as "risk", "injuries" or "death" with respect to the TUC:

"Boxing should be banned". The background may be used in further steps in addition to the TUC, as will be detailed herein below.

In an optional step 110, claim sections may be detected. Sections within the received content that with high probability may include claims relevant to the TUC (or simply 'relevant claims'), may be detected. The detection of such sections may include identifying sections which have a title relevant to the TUC. For example, some articles may be sub-divided into titled sections. Such a section structure may be exploited to narrow the search for claims. For example, for the topic "Boxing should be banned", a section titled "Medical concerns" in a 'boxing' article or a section titled "Criticism", with respect to any topic, may be probably a good source for claims. Having "concerns" in the title may be a good indication for the presence of claims. On the other hand, a 'historical' section, for example, may probably not include many claims. Furthermore, claims may tend to appear together in dedicated sections. Thus, if a section is identified as highly related to a TUC and includes many matches to 'claim' patterns (as will be elaborated below), the section may advantageously be explored. Optionally, the detection of claim sections may be performed in a similar manner to the detection of claim sentences (i.e., sentences which may include claims with high probability) with the required modifications, e.g., by detecting similar features, as detailed herein below. For example, patterns may be learned directly at the section level (as opposed to the sentence level). In addition, lexicons of words that tend to appear more in sections which include claims than in sections which does not, may be used.

In an optional step 120, sentences in the content and/or in the detected sections, which may include, with high probability, claims relevant to the TUC, may be detected. The detection of the sentences may be performed by detecting features such as features that may characterize a claim in its general sense (thus, may indicate the presence of a claim) and/or features that may assess the relevancy of a sentence to the TUC. These features may form two independent sub-components of the sentence detection component. Features that may characterize a claim in its general sense, regardless of whether or not they relate to the TUC, may be, for example, presence of the sentence in a sub-section entitled "criticism", presence of phrases which are likely to appear in a claim in the sentence, and such as "argues that" etc. Features that may assess the relevancy of a sentence to the TUC, regardless of whether or not the sentence is a claim, may be based, for example, on the relations between terms included in the sentence and terms included in the TUC and/or in the TUC background. The detection of the sentences may be performed by utilizing machine learning algorithms such as Logistic Regression (LR), Support Vector Machines (SVM), Naïve Bayes classifiers etc.

Thus, this sentence component may be responsible for detecting CDC sentences, that is, to determine whether a candidate sentence may contain a CDC or not. Some sentences may include more than one relevant claim but this may not be very common. Hence, sentence detection may be considered as a binary classification problem. The component may pass a predefined number or percentage (i.e., out of the detected sentences) of the top scoring sentences to the next step or component (e.g., top scoring 200 out of 1500 sentences per TUC in average). Alternatively, a score cutoff may be used. For example, an LR classifier may be used due to its efficiency and its model interpretability. Highly discriminative features may be developed for this classifier. In order to detect features that may assess the relevancy of a sentence to the TUC. i.e., context features, relation between a candidate sentence and the TUC may be examined. The TUC may be used as received (e.g., as it appears in debatabase (http://idebate.org/debatabase)). Specifically, the most such dominant features may include:

MatchAtSubject: Cosine similarity between the TUC and the subjects of the candidate sentence, namely, all tokens that are marked as the subject of some sub-tree in the sentence English Slot Grammar (ESG) parse tree (M. C. McCord, J. W. Murdock, and B. K. Boguraev. 2012. Deep parsing in watson. IBM *J. Res. Dev.*, 56(3):264-278, May).

ExpandedCosineSimilarity: Cosine similarity between the TUC and semantic expansions of the candidate sentence. For example, one may use WordNet (George A. Miller. 1995. Wordnet: A lexical database for English. *COMMUNICATIONS OF THE ACM*, 38:39-41) to expand nouns into synonyms, hypernyms and hyponyms.

ESGFeatures: Binary features obtained from the ESG parser (see McCord et al. as mentioned herein above). Such an exemplary prominent feature is an indicator of whether the sentence includes the token "that" that is assigned the "conjugate" feature by the ESG, for example, the emphasized "that" in the example in Table 2 above. The features may further include: verb in present tense, infinitive verb, year, and named location.

Sentiment: Ratio of sentiment words in the sentence, based on a list of sentiment words from: Minqing Hu and Bing Liu. 2004. Mining and summarizing customer reviews. *In Knowledge Discovery and Data Mining*, pages 168-177.

Features that may characterize a claim in its general sense, i.e., context-free features, may rely solely on the content of the candidate sentence, aiming to capture the probability it may include a "claim like" statement. Such features may be, for example, "argues that" prefix or claim-word lexicons.

In addition or alternatively to context features and context-free features, features that represent a mix of these two types may be used. For example, binary features that may check a list of manual patterns based on context and context-free features may be used. Each of these features values may be set to one if a candidate sentence has a match with the relevant pattern, and to zero if otherwise. For example, the sentence in Table 2 above, may match the pattern [that], [TUC], [Sentiment] in the sense that it has the word 'that' followed by a word that appears in the TUC and followed by a sentiment word (that→games→unethical).

In a step 130, claims relevant to the TUC may be detected in the content and/or detected sections and/or detected sentences. Content, a single section or a single sentence may include one or more claims. The claims may be detected based on detection of boundaries of the claims in the content and/or detected sections and/or detected sentences. The claims boundaries detection may be performed based on a probabilistic model that aims to assess the probability that a word in content, a section or a sentence may be the opening or closing word of a claim. For example, given a set of labeled claims in their surrounding sentences, one may compute the frequency of $w_0$, $w_1$, $w_n$, $w_{n+1}$, where $w_0$ indicates the word before the claim, $w_1$ indicates the first word of the claim, $w_n$ indicates the last word of the claim and $w_{n+1}$ indicates the word after the claim. For example, the word 'that' in position $w_0$ is often a good indication of a beginning of a claim. Having no word at all in position $w_0$ (meaning that $w_1$ starts the content or section or sentence) may be also a good indication. These frequencies may be used as probabilities where one option may be to multiply the four probabilities under the independence assumption to receive an overall probability of having the claim begin or end at a certain position. A machine learning approach may be used according to which features may be computed for three parts of the sentence: prefix—the part preceding the candidate claim boundaries, candidate—the candidate claim itself, and suffix—the part following the candidate claim boundaries. The features may be similar to the features discussed above with respect to claim sentence detection. When content or a section is concerned (i.e., when a relatively large amount of text is concerned), its size may be limited in order to reduce runtime.

Thus, the claim detection or claim boundaries component may be responsible for detecting the exact CDC boundaries within content, CDC-sections and/or CDC-sentences. It should be noted that in free text articles a CDC may often not correspond to an easily identified sub-tree in a sentence parse tree. For example, in the sentence: "The argument of deprivation states that abortion is morally wrong because it deprives the fetus of a valuable future", choosing the boundaries from "abortion" to "future" may have included two distinct claims. Therefore, determining where the CDC should start may be quite a subtle decision. Thus, the exact CDC boundaries may often rely on the semantics of the text, and not just on its grammatical structure. Correspondingly, identifying the exact CDC boundaries may be far from trivial.

Based on similar considerations to those mentioned above, the component of claim detection may be divided into two sub-components. Accordingly, the detection of claim boundaries may be performed in a two stage manner. First, a boundaries course filter may be applied. Then, a boundaries fine grained filter may be applied on the outcome of the application of the boundaries course filter.

The boundaries coarse filter may be based on a Maximum Likelihood (ML) probabilistic model. For example, given content, a section or a sentence, the model may select a predefined number (e.g., 10) of sub-sentences whose boundaries most probably correspond to a CDC. Specifically, given a sentence, for each of its sub-sentences (i.e., any consecutive sequence of three tokens or more that is included in the examined sentence) one may consider the token preceding it; the token with which it starts; the token with which it ends; and the token following it. Given these four tokens, the algorithm may estimate the probability that this sub-sentence represents a CDC. For practical purposes, the probability may be estimated naively, by assuming that each token is independent of the others. In addition, the boundaries coarse filter may employ simple rules to filter out trivial cases such as sub-sentences that do not contain a verb and a noun, or sub-sentences for which the parse root is tagged as a sentence-fragment.

The boundaries fine-grained filter may be based on an LR classifier that may, for example, select one sub-sentence out of the sub-sentences provided by the boundaries coarse filter. Here as well, one may consider context-free features and context features, where the former type may be typically weighted as more dominant by the LR classifier. The context-free features examined by this sub-component may rely on the division of the entire sentence, as implied by the examined boundaries. Specifically, the candidate boundaries may induce a division of the containing sentence into three parts: prefix, candidate body, and suffix, where the prefix and/or suffix may be empty. The features may be then calculated for each of these three parts independently. Thus, for example, the presence of the word "that" in the prefix as opposed to its presence in the candidate body, may increase or decrease the confidence of the examined boundaries, respectively. In addition, the LR classifier may consider features derived from the probabilistic model defined by the boundaries coarse filter that may also aim to assess the probability that the examined boundaries yield a CDC.

The boundaries fine-grained filter may be used to examine features. Such exemplary features are described in the following paragraphs:

CDC-Probability features: These features may indicate the conditional probability that the examined boundaries define a CDC, given the tokens around and within these boundaries. For example, the Word-Before-Word-After numeric feature, denoted $P(t_a, t_b)$, which may be defined, for example, as follows. Let $\{t_1, \ldots, t_n\}$ represent the list of tokens in a sentence, where a token is a word or a punctuation mark, then $P(t_a, t_b)$ is the probability that the sub sentence $\{t_i, \ldots, t_j\}$ represents a CDC, given that $t_{i-1}=t_a$, $t_{j+1}=t_b$, as estimated from training data. Similarly, the Word-Before-First-POS feature may be based on the estimated conditional probability that the candidate defined by the examined boundaries is a CDC, given the token before the boundaries, and the POS-tag of the first token within the boundaries, $t_i$. Other features of this type may include the conditional probability based on the presence of single tokens within the boundaries, and an initial score which may be assigned to the examined boundaries by the boundaries coarse filter.

Sentence-Probability features: These features may aim to indicate the probability that the examined boundaries induce a grammatically correct sentence. For this purpose a set of 100,000 presumably grammatically correct sentences, taken from a separate set of Wikipedia articles, were examined. The probability of each word to appear in a given position in a valid sentence was estimated. Given the examined boundaries, one may then ask for each of the first three tokens and each of the last three tokens (i.e., defined by the given boundaries), what is the probability of having a grammatically correct sentence, given that the observed token is in its observed position.

Modifier Separation: The ESG parser (McCord et al., as mentioned above) may describe the modifiers of its parsed tokens, such as the object of a verb. Typically, a token and its modifier may either be jointly included in the CDC, or not included in it. This notion may give rise to several corresponding features, e.g., a binary question: does the boundary break a token from its modifiers?

Parse Sentence Match: These features are binary features that may indicate whether the examined boundaries correspond to a sub-tree whose root is labeled "S" (sentence), e.g., by the Stanford parser (Richard Socher, John Bauer, Christopher D. Manning, and Andrew Y. Ng. 2013. Parsing With Compositional Vector Grammars. In ACL.) or by the ESG parser (McCord et al., as mentioned herein above), while parsing the entire surrounding sentence.

"that-conj" matches CDC: A binary feature, which may indicate whether, in the ESG parsing, a subordinator "that" token, whose corresponding covered text matches the examined boundaries, is present.

Digit Count: This feature may count the number of digits appearing, for example, in the sentence including the examined boundaries before, within, and after the examined boundaries.

Unbalanced Quotes or Parenthesis: This may refer to binary features, which may indicate whether there is an odd number of quote marks, or unbalanced parenthesis, within the examined boundaries.

In an optional step 140, the detected claims may be phrased. In this step, the phrasing of the detected claims may be corrected, if such a phrasing correction is required. For example, by using co-reference resolution, i.e., a pronoun may be replaced with its referent (e.g., in the pro claim of example 3 above, "it" may be replaced by "boxing"), a redundant word may be removed, tense modifications (e.g., by replacing past tense with present tense), etc.

In an optional step 150, the detected claims may be classified with respect to the TUC. The classification may be performed by characterizing the claims according to pre-defined types of claims. A single claim may be classified as pertaining to one or more such types. Possible types of claims may be, for example, an opinion claim (e.g., a moral claim such as the con claim of Example 2 above) or a factual claim (see Example 2 above, the pro claim), etc. Each classified claim may be associated with a classification tag including the one or more claim types the claim pertains to.

In an optional step 160, calculation of a claim score for each of the detected claims may be performed. Each of the detected claims may be associated with a claim score. The claim score may be based on a confidence score and/or classification confidence score. Thus, calculation of a classification confidence score for each of the classified detected claims may be performed. Each of the classification tags may be associated with a classification confidence score. The scores may be calculated by utilizing known machine learning techniques such as Naïve Bayes, LR and/or SVM. The confidence scores may reflect the confidence level of the results. For example, a claim confidence score may indicate the level of confidence that the detected claim is indeed a claim and with respect to the TUC. Accordingly, a respectively high score may indicate of a candidate claim which may be a claim relevant to the TUC. A respectively low score may indicate of a candidate claim which may not be a claim, i.e., in its general sense.

In some embodiments, quality scores may be calculated for the detected claims. A quality score may quantify the quality of a detected claim in various dimensions such as conciseness, generality, degree of direct support/contradiction to the TUC and/or phrasing, etc. The claim score may alternatively or additionally be based on such quality scores.

Such scores (e.g., confidence scores and/or quality scores) may be assigned to each claim at the above described steps or by the above described components, correspondingly.

In some embodiments, the detected claims may be ranked according to their claim score. The ranking may be based on weighting of the various scores (e.g., confidence scores and/or quality scores) for each detected claim.

In some embodiments, such scoring and ranking component may be based on an LR classifier that may consider the scores of previous steps or components, as well as additional features, as described below. In some embodiments, the claim score may simply rely solely on the score provided by the sentence component (i.e., according to step 120 of sentence detection). However, since CDCs often correspond to much smaller parts of their surrounding sentence, considering the scores of all previous components may be more effective.

In contrast to the components described above, for which a training set may be fully defined by the labeled data, the scoring and ranking component may require training also on the output of its "upstream" components, since it may rely on the scores produced by these components.

The scoring and ranking component may additionally use features such as the following:
Candidate Complexity, which is a score based on counting
  punctuation marks, conjunction adverbs (e.g., "likewise" or "therefore"), sentiment shifters (e.g., "can not", "undermine") and references, included in the candidate CDC; and
Sentiment, Expanded Cosine Similarity and Match At Subject, as in the sentence component above (i.e., as described in step 120 with respect to sentence detection), which may be estimated specifically for the CDC candidate.

In some embodiments, the above steps (some or all of them) may be applied recursively on previously detected claims in order to recover indirect claims and counter claims. For example, given the TUC, T1, and a corresponding detected claim, C1, another instance of claim detection according to the disclosed techniques may search for claims that support or contest C1 when C1 functions as the TUC. Such a process may be repeated to obtain a tree structure of the claims, such as: T1→C1→C2.

In an optional step 170, a list of claims may be outputted. The list of claims may be possibly classified into claim types, and/or sorted according to their confidence scores or ranked, e.g., according to weighting of the various scores. The output of the list of claims may be such that it may be used by a human or by a machine, including software components (e.g., when the disclosed claim detection is incorporated in a more extensive tool). The output may be presented to the user, e.g., by displaying the list of claims, uttering (i.e., by using known in the art text-to-speech techniques) it or by printing it.

A varying number of claims may be expected to be outputted, while the number of 'real' claims (i.e., actual CDCs) may vary significantly. In order for the disclosed claim detection to adapt accordingly, a score threshold which may optimize some measure on the training TUCs (for example: F1=harmonic-mean(Precision,Recall), while recall is the number of correct predictions divided by the number of real claims in the data, and precision is the number of correct predictions divided by the number of predictions) may be used. In some embodiments, the thresholds of the tested TUC may be estimated according to its similarity to the training TUCs.

The disclosed claims detection may rely on various techniques from areas such as machine-learning, statistical analysis, text-analytics, natural language processing, and more.

The above steps may be implemented, for example, as functions realized by software.

Figure 2:
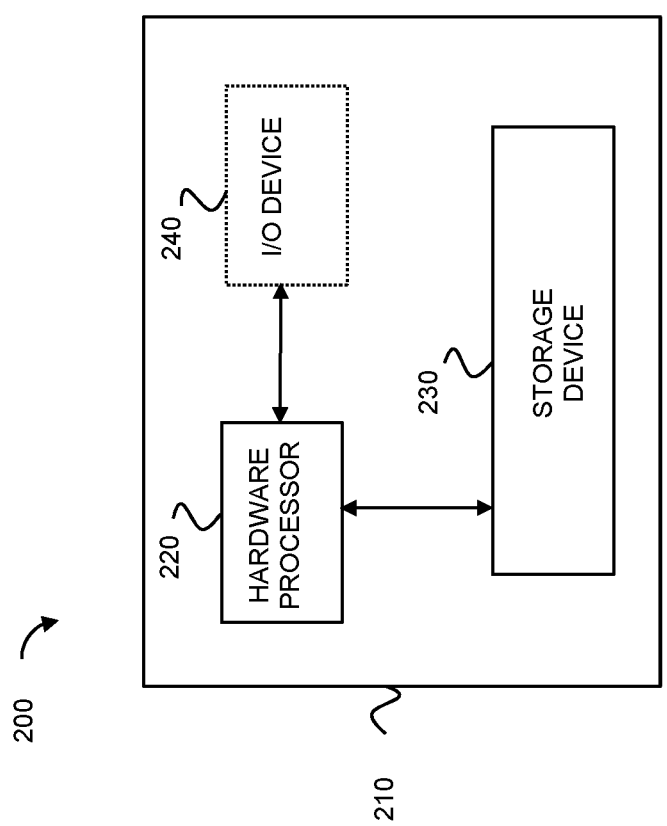
FIG. 2 shows an exemplary system according to an embodiment.

Reference is now made to FIG. 2, which shows an exemplary system 200 according to an embodiment. System 200 may include a computing device 210. Computing device 210 may include a hardware processor 220, a storage device 230 and an optional input/output ("I/O") device 240. Hardware processor 220 may include one or more hardware processors, storage device 230 may include one or more storage devices and I/O device 240 may include one or more I/O devices. Hardware processor 220 may be configured to execute the method of FIG. 1. I/O device 240 may be configured to allow a user to interact with system 200. For example, I/O device 240 may include a display, a loudspeaker and/or a printer which may for example output a list of claims for a user according to the method of FIG. 1. Dedicated software, implementing the method of FIG. 1 may be stored on storage device 230 and executed by hardware processor 220.

In some embodiments, computing device 210 may include an I/O device 240 such as a terminal, a display, a keyboard, a mouse, a touch screen, a loudspeaker, a printer, an input device or the like to interact with system 200, to invoke system 200 and to receive results. It will however be appreciated that system 200 may operate without human operation and without I/O device 240.

In some exemplary embodiments of the disclosed subject matter, storage device 230 may include or be loaded with a user interface. The user interface may be utilized to receive input, such as a TUC, a content and/or a background and/or provide output, such as a claim list, to and from system 200, including receiving specific user commands or parameters related to system 200, providing output, or the like.

Experimental Results

Data

The disclosed supervised learning approach relies on labeled data that was collected as described below. A detailed description of the labeling process is given in: Ehud Aharoni, Anatoly Polnarov, Tamar Lavee, Daniel Hershcovich, Ran Levy, Ruty Rinott, Dan Gutfreund, and Noam Slonim. 2014. A benchmark dataset for automatic detection of claims and evidence in the context of controversial topics. In *Proceedings of the 52nd Annual Meeting of the Association for Computational Linguistics*, First Workshop on Argumentation Mining. Association for Computational Linguistics, June. Due to the high complexity of the labeling task, in-house labelers were used, which were provided with detailed guidelines, and went through rigorous training.

At the core of the labeling guidelines, the definition of a CDC as a general, concise statement that directly supports or contests the given TUC was outlined. In practice, the labelers were asked to label a text fragment as a CDC if and only if it complies with all the following five criteria:

Strength—Strong content that directly supports/contests the TUC;

Generality—General content that deals with a relatively broad idea;

Phrasing—The labeled fragment should make a grammatically correct and semantically coherent statement;

Keeping text spirit—Keeps the spirit of the original text; and

Topic unity—Deals with one topic, or at most two related topics.

The guidelines further included concrete examples, taken from Wikipedia articles, to clarify these criteria. When in doubt, the labelers were naturally asked to make a judgment call. The labelers work was carefully monitored, and they were provided with detailed feedback as needed.

Thirty-two debate motions were selected at random from http://idebate.org/debatabase, covering a wide variety of topics, from atheism to the US responsibility in the Mexican drug wars. Each motion served as a single TUC and went through a rigorous labeling process, consisted of three stages. First, given a Topic, 5 labelers searched Wikipedia independently for articles that they believed to contain CDCs. Next, each of the articles identified in this search stage was read by 5 labelers that worked independently to detect candidate CDCs. Finally, each of the candidate CDCs proposed in the previous stage, was examined by 5 labelers that independently decided whether to confirm or reject the candidate. For the purposes of this experiment, only candidate CDCs that were confirmed by a majority, i.e., by at least three labelers participating in the confirmation stage, were considered. The resulting labeled CDCs corresponded to claims that may be naturally used in a discussion about the given TUC.

Through this process, for the 32 examined TUCs, a total of 326 Wikipedia articles were labeled, yielding a total of 976 CDCs. Thus, even when considering articles that were presumably relevant to the given TUC, on average only 2 out of 100 sentences included a CDC. On the other hand, it should be noted that it was not clear to begin with that Wikipedia articles may contain CDCs that satisfy the relatively strict labeling guidelines. Nonetheless, on average, the labeling process yielded around 30 CDCs per TUC. Finally, the average Kappa agreement between pairs of labelers in the confirmation stage was 0.39, which is a relatively high agreement considering the complexity of the labeling task and the inherent elusiveness of the involved concepts.

Experiment

The results of running the cascade of the aforementioned components, in the designated order, in a Leave-One-Out (LOO) fashion, over 32 Topics are herein described. In each LOO fold, the training data consisted of the labeled data for 31 TUCs, while the test data consisted of articles that included at least one CDC for the designated test TUC.

The sentence component (i.e., section detection according to step 120 of FIG. 1) was run with the goal of selecting 200 sentences for the test TUC, and sorting them so that CDC-containing sentences may be ranked as high as possible. As shown in Table 3 below, the mean precision and recall of this component, averaged across all 32 folds, were 0.09 and 0.73, respectively. When looking at the top scoring 50 sentences per TUC, the mean precision and recall are 0.18 and 0.4, respectively. As evident by the last row in Table 3, these results are beyond a trivial random selection of sentences, indicating that the sentence component is capturing a strong statistical signal associated with CDCs.

TABLE 3

Sentence component. Last line indicates the expected values had selection been made at random.

| Recall at 50 | Precision at 50 | Recall | Precision | |
|---|---|---|---|---|
| 0.4 | 0.18 | 0.73 | 0.09 | mean |
| 0.21 | 0.10 | 0.19 | 0.05 | std |
| 0.10 | 0.02 | 0.27 | 0.01 | min |
| 1.00 | 0.40 | 1.00 | 0.18 | max |
| 0.03 | 0.02 | 0.13 | 0.02 | rand |

Next, the two sub-components of the boundaries component were employed (i.e., claim boundaries detection according to step 130 of FIG. 1). First, the boundaries coarse filter selected 10 sub-sentences for each candidate sentence. The aim for sentences which actually contain CDCs, was to have this CDC kept among the selected 10 sub-sentences. As shown in Table 4 below, this happened for 98% of the CDC-containing sentences. In other words, if the examined sentence included a CDC, the boundaries coarse filter almost always included this CDC as one of the top 10 sub-sentences it suggested for that sentence. In the second step, for each candidate sentence, the boundaries fine-grained filter sorted the 10 sub-sentences proposed by the boundaries coarse filter, aiming to have the CDC, if one exists, at the top. As indicated in Table 4, if indeed a CDC was present amongst the 10 sub-sentences sorted by this component, then it was ranked first in 50% of the cases. These results as well are clearly beyond what is expected by random sorting, indicating a strong statistical signal that was properly captured by this component.

TABLE 4

Boundaries component: The left column relates to the fraction of sentences where the labeled CDC is among the top 10 candidates ranked by the coarse filter. The right column relates to the fraction of sentences where the labeled CDC is identified correctly by the fine-grained filter. The last row indicates the expected values had selection been made at random.

| Boundaries Fine-Grained Filter Recall | Boundaries Coarse Filter Recall | |
|---|---|---|
| 0.50 | 0.98 | mean |
| 0.16 | 0.39 | std |
| 0.25 | 0.67 | min |
| 1.00 | 1.00 | max |
| 0.004 | 0.04 | rand |

Finally, the scoring and ranking component was used to combine the scores generated in the previous steps, as well as additional features, to set the final order of CDC candidates. The goal of this component, similar to that of the entire CDCD task, was to select 50 CDC candidates with high precision. One should note, that on average, there may be around 30 labeled CDCs per TUC. Thus, on average, the maximal precision at 50 should be around 0.6. As indicated in Table 5 below, the final precision at 50, averaged across all 32 folds, was 0.12, which is again beyond random performance. Focusing at the top predictions, naturally results with even higher precision. For example, the precision of the top 5 predictions was on average 0.23.

It should be noted that the analysis presented here is fairly strict. A predicted CDC is considered as True Positive if and only if it precisely matches a labeled CDC that was confirmed as such by at least three labelers. Thus, for example, if a predicted CDC was confirmed by only two out of five annotators, it will be considered as an error in the analysis above. Furthermore, if the predicted CDC has a significant overlap with a labeled CDC, it will still be considered as an error, even if it represents a grammatically correct variant of the labeled CDC that was simply less preferred by the labelers due to relatively minor considerations. Thus, it is clear that for most practical scenarios, the performance of the disclosed claim detection is above the strict numbers described here.

TABLE 5

Ranking component

| Precision at 50 | Precision at 20 | Precision at 10 | Precision at 5 | |
|---|---|---|---|---|
| 0.12 | 0.16 | 0.20 | 0.23 | mean |
| 0.07 | 0.11 | 0.20 | 0.21 | std |
| 0.00 | 0.00 | 0.00 | 0.00 | min |
| 0.32 | 0.50 | 0.60 | 0.80 | max |
| 0.00008 | 0.00008 | 0.00008 | 0.00008 | rand |

TABLE 6

Number of "false" claims in each rejection category.

| Number of candidates | Category |
|---|---|
| 27 | Accept |
| 3 | Accept with corrections |
| 9 | Generality failed |
| 145 | Strength failed |
| 1 | Text Spirit failed |
| 5 | Multiple candidates |
| 5 | Repeats topic |

TABLE 6-continued

Number of "false" claims in each rejection category.

| Number of candidates | Category |
|---|---|
| 37 | Incoherent |
| 17 | Not a sentence |

Error Analysis

The presented error analysis covers the same 32 TUC described above, where for each TUC the errors among the top 10 predictions is analyzed. In total there were 249 sentences which did not exactly match the annotated data. Each of these seemingly-erroneous CDC candidates was then given to 5 annotators, who had to confirm or reject it and select a rejection reason. The goal of the analysis is to understand the types of errors the disclosed claim detection makes as well as to obtain feedback on text spans that were not originally detected by the labelers (possible misses). Specifically, the labelers were instructed to choose one of the options in the following list:

Accept—The candidate should be accepted as is;
Accept with correction—The candidate should be accepted with minor corrections;
Generality failed—The candidate is too specific;
Multiple Candidates—The candidate contains more than one claim;
Repeats Topic—The candidate simply reiterates the TUC (or its negation) rather than claim something about it;
Strength failed—The candidate does not directly and explicitly supports or contests the TUC;
Text Spirit failed—The candidate does not keep the spirit of text in which it appeared;
Incoherent—The candidate is not a coherent claim; and
Not a sentence—The candidate is not grammatical.

A majority vote was used to obtain the final answer. Table 6 below provides the number of candidates in each category. As may be seen, about 10% of the candidates were actually accepted in this round. Most of the errors were attributed to "Strength Failed", which is a fairly wide category. Table 7 below provides some examples of candidates generated by the disclosed claim detection (which do not exactly match the annotated data) and their corresponding categories.

TABLE 7

Example sentences for each rejection category.

| Candidate claim | Topic | Category |
|---|---|---|
| Some researchers believe that while playing violent video games leads to violent actions, there are also biological influences that impact a person's choices. | The sale of violent video games to minors should be banned. | Accept. |
| Proponents of a similar law proposed for Texas in March 2009 also argued that photo identification was necessary to prevent widespread voter fraud. | Democratic governments should require voters to present photo identification at the polling station. | Accept with Corrections. |
| While psychological stress experienced during a cycle might not influence an IVF outcome, it is possible that the experience of IVF can result in stress that leads to depression. | Parents should be allowed to genetically screen foetuses for heritable diseases. | Generality failed. |
| Physical education trends have developed recently to incorporate a greater variety of activities. | Physical education should be compulsory. | Strength failed. |
| However, the trade-off between risk | Parents should | Strength |

TABLE 7-continued

Example sentences for each rejection category.

| Candidate claim | Topic | Category |
|---|---|---|
| of birth defect and risk of complications from invasive testing is relative and subjective; some parents may decide that even a 1:1000 risk of birth defects warrants an invasive test while others wouldn't opt for an invasive test even if they had a 1:10 risk score. | be allowed to Genetically screen for heritable diseases. | failed. |
| This has made international news, and had led to accusations that many doctors are willing to seriously endanger the health and even life of women in order to gain money. | Parents should be allowed to genetically screen foetuses for heritable diseases. | Strength failed. |
| The use of wind power reduces the necessity for importing electricity from abroad and strengthens the regional economy. | Wind power should be a primary focus of future energy supply | Multiple candidates. |
| More recently, a Quinnipiac poll from June 2009 finds that 55% of Americans feel that affirmative action should be abolished, yet 55% support affirmative action for disabled people. | Affirmative action should be used. | Repeats topic. |
| The difference with bribery is that this is a tri-lateral relation. | Bribery is sometimes acceptable. | Incoherent. |
| Having this information in advance of the birth means that healthcare staff as well as parents can better prepare themselves for the delivery of a child with a health problem. | Parents should be allowed to genetically screen foetuses for heritable diseases. | Incoherent. |
| Mandatory retirement is the age at which persons who hold certain jobs or offices are required by industry custom or by law to leave their employment, or retire. | A mandatory retirement age should be instituted. | Not a sentence. |

The performance of the disclosed claim detection was assessed over a novel benchmark dataset, carefully developed for this task. The results verify the soundness of the disclosed definitions, and the validity of the introduced CDCD task.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising using at least one hardware processor for:
   receiving a topic under consideration (TUC) and content relevant to the TUC;
   detecting one or more claims relevant to the TUC in the content, based on detection of boundaries of the claims in the content, wherein the detection of boundaries comprises using a machine learning classifier trained on label claims in their surrounding sentences, wherein each of the labeled claims is a concise statement that directly supports or contests a training TUC; and
   outputting a list of said detected one or more claims.

2. The method of claim 1, further comprising using said at least one hardware processor for receiving a background related to the TUC.

3. The method of claim 1, further comprising using said at least one hardware processor for detecting sentences in the content which are highly probable to comprise claims relevant to the TUC, wherein said detection of one or more claims relevant to the TUC is performed in the detected sentences based on detection of boundaries of the claims in said detected sentences.

4. The method of claim 3, wherein said detecting of sentences comprises detecting features of a type selected from the group consisting of: features that characterize a claim in its general sense, features that assess the relevancy of a sentence to the TUC and features that are a mix of features that characterize a claim in its general sense and features that assess the relevancy of a sentence to the TUC.

5. The method of claim 3, wherein said detection of boundaries comprises:
   applying a boundaries coarse filter; and
   applying a boundaries fine-grained filter.

6. The method of claim 1, further comprising using said at least one hardware processor for detecting sections in the content which are highly probable to comprise claims relevant to the TUC, wherein said detection of one or more claims relevant to the TUC is performed in the detected sections based on detection of boundaries of the claims in the detected sections.

7. The method of claim 6, further comprising using said at least one hardware processor for detecting sentences in said detected sections which are highly probable to comprise claims relevant to the TUC, wherein said detection of one or more claims relevant to the TUC is performed in said detected sentences, based on detection of boundaries of the claims in said detected sentences.

8. The method of claim 1, further comprising using said at least one hardware processor for phrasing the detected one or more claims.

9. The method of claim 1, further comprising using said at least one hardware processor for classifying the detected one or more claims with respect to the TUC, wherein said classifying comprises characterizing said one or more claims according to predefined types of claims.

10. The method of claim 1, further comprising using said at least one hardware processor for calculating a claim score for each of said one or more detected claims and ranking each of said one or more detected claims based on its claim score.

11. The method of claim 1, further comprising using said at least one hardware processor for applying said detecting of one or more claims recursively on previously detected claims.

12. A computer program product comprising a non-transitory computer-readable storage medium having program code embodied therewith, the program code executable by at least one hardware processor to:
   receive a topic under consideration (TUC) and content relevant to the TUC;
   detect one or more claims relevant to the TUC in the content, based on detection of boundaries of the claims in the content, wherein the detection of boundaries comprises using a machine learning classifier trained on label claims in their surrounding sentences, wherein each of the labeled claims is a concise statement that directly supports or contests a training TUC; and
   output a list of said detected one or more claims.

13. The computer program product of claim 12, wherein said program code is further executable by said at least one hardware processor to detect sentences in the content which are highly probable to comprise claims relevant to the TUC, wherein said detection of one or more claims relevant to the TUC is performed in the detected sentences based on detection of boundaries of the claims in said detected sentences.

14. The computer program product of claim 13, wherein said detecting of sentences comprises detecting features of a type selected from the group consisting of: features that characterize a claim in its general sense, features that assess the relevancy of a sentence to the TUC and features that are a mix of features that characterize a claim in its general sense and features that assess the relevancy of a sentence to the TUC.

15. The computer program product of claim 13, wherein said detection of boundaries comprises:
 applying a boundaries coarse filter, and
 applying a boundaries fine grained filter.

16. The computer program product of claim 12, wherein said program code is further executable by said at least one hardware processor to detect sections in the content which are highly probable to comprise claims relevant to the TUC, wherein said detection of one or more claims relevant to the TUC is performed in the detected sections based on detection of boundaries of the claims in the detected sections.

17. The computer program product of claim 16, wherein said program code is further executable by said at least one hardware processor to detect sentences in said detected sections which are highly probable to comprise claims relevant to the TUC, wherein said detection of one or more claims relevant to the TUC is performed in said detected sentences, based on detection of boundaries of the claims in said detected sentences.

18. The computer program product of claim 12, wherein said program code is further executable by said at least one hardware processor to calculate a claim score for each of said one or more detected claims and rank each of said one or more detected claims based on its claim score.

19. The computer program product of claim 12, wherein said program code is further executable by said at least one hardware processor to apply said detecting of one or more claims recursively on previously detected claims.

20. A system comprising:
 (i) a storage device having stored thereon instructions for:
  receiving a topic under consideration (TUC) and content relevant to the TUC,
 detecting one or more claims relevant to the TUC in the content, based on detection of boundaries of the claims in the content, wherein the detection of boundaries comprises using a machine learning classifier trained on label claims in their surrounding sentences, wherein each of the labeled claims is a concise statement that directly supports or contests a training TUC; and
 outputting a list of said detected one or more claims; and
 (ii) at least one hardware processor configured to execute said instructions.

\* \* \* \* \*